(12) United States Patent
Mahale et al.

(10) Patent No.: US 12,412,068 B2
(45) Date of Patent: Sep. 9, 2025

(54) POWER-EFFICIENT HYBRID TRAVERSAL APPARATUS AND METHOD FOR CONVOLUTIONAL NEURAL NETWORK ACCELERATOR ARCHITECTURE

(71) Applicant: SAMSUNG ELECTRONICS CO., LTD., Suwon-si (KR)

(72) Inventors: Gopinath Vasanth Mahale, Karnataka (IN); Pramod Parameshwara Udupa, Karnataka (IN); Kiran Kolar Chandrasekharan, Karnataka (IN); Sehwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 924 days.

(21) Appl. No.: 17/033,132

(22) Filed: Sep. 25, 2020

(65) Prior Publication Data

US 2021/0117755 A1    Apr. 22, 2021

(30) Foreign Application Priority Data

Sep. 27, 2019 (IN) ............................. 201941039259
Sep. 4, 2020 (IN) ............................. 201941039259
Sep. 24, 2020 (KR) ........................ 10-2020-0123723

(51) Int. Cl.
*G06N 3/04* (2023.01)
(52) U.S. Cl.
CPC ...................................... *G06N 3/04* (2013.01)
(58) Field of Classification Search
CPC .......... G06N 3/04; G06N 3/045; G06N 3/063; G06F 7/523
See application file for complete search history.

(56) References Cited

U.S. PATENT DOCUMENTS

2018/0101763 A1\* 4/2018 Barnard .............. G06F 12/0207
2018/0189642 A1\* 7/2018 Boesch ................. G06F 30/327
(Continued)

FOREIGN PATENT DOCUMENTS

CN   109543816 A    3/2019
CN   109685208 A    4/2019
(Continued)

OTHER PUBLICATIONS

Online, Rose-Hullman. "Convolution Example #1." YouTube, YouTube, Dec. 5, 2012, www.youtube.com/watch?v=_RsMMkuQVUE. (Year: 2012).\*

(Continued)

*Primary Examiner* — Miranda M Huang
*Assistant Examiner* — Sidney Vincent Bostwick
(74) *Attorney, Agent, or Firm* — NSIP Law

(57) ABSTRACT

Disclosed is a hybrid traversal apparatus and method for a convolution neural network (CNN) accelerator architecture that receives input feature map (IFM) microbatches from a pixel memory and receiving kernel microbatches from a kernel memory, multiplies the IFM microbatches by the kernel microbatches while reusing the kernel microbatches based on a kernel reuse factor for at least one of a direct convolution (DConv) or a Winograd convolution (Wg-Conv), to obtain output feature map (OFM) microbatches, and writes the generated OFM microbatches to the pixel memory, after quantization, non-linear function, and pooling on a result of the multiplying.

20 Claims, 17 Drawing Sheets

(56) References Cited

U.S. PATENT DOCUMENTS

| | | | |
|---|---|---|---|
| 2019/0243610 A1* | 8/2019 | Lin | G06N 3/08 |
| 2019/0279072 A1* | 9/2019 | Gao | G06N 3/045 |
| 2019/0311242 A1* | 10/2019 | Chen | G06N 3/04 |
| 2019/0370631 A1* | 12/2019 | Fais | G06F 17/15 |
| 2020/0034148 A1 | 1/2020 | Sumbul et al. | |
| 2020/0050555 A1* | 2/2020 | Kim | G06N 20/10 |

FOREIGN PATENT DOCUMENTS

| | | |
|---|---|---|
| CN | 109784489 A | 5/2019 |
| CN | 110135561 A | 8/2019 |
| CN | 110782022 A | 2/2020 |
| CN | 110837806 A | 2/2020 |
| KR | 10-2019-0014900 A | 2/2019 |

OTHER PUBLICATIONS

Al Bahou, Andrawes, et al. "Xnorbin: A 95 TOp/s/W hardware accelerator for binary convolutional neural networks." 2018 IEEE Symposium in Low-Power and High-Speed Chips (Cool Chips). IEEE, 2018 (3 pages in English).

Garland, James et al. "Low complexity multiply-accumulate units for convolutional neural networks with weight-sharing." ACM Transactions on Architecture and Code Optimization (Taco) 15.3 (2018): 1-24 (24 pages in English).

\* cited by examiner

POWER-EFFICIENT HYBRID TRAVERSAL APPARATUS AND METHOD FOR CONVOLUTIONAL NEURAL NETWORK ACCELERATOR ARCHITECTURE

CROSS-REFERENCE TO RELATED APPLICATIONS

This application claims the benefit under 35 USC § 119(a) of Indian Provisional Application No. 201941039259 filed on Sep. 27, 2019 and Indian Application No. 201941039259 filed on Sep. 4, 2020, filed in the Indian Patent Office, and Korean Patent Application No. 10-2020-0123723 filed on Sep. 24, 2020 in the Korean Intellectual Property Office, the entire disclosures of which are incorporated herein by reference for all purposes.

BACKGROUND

1. Field

The following description relates to a convolutional neural network (CNN) architecture, and more particularly, to a power-efficient hybrid traversal for a CNN accelerator architecture.

2. Description of Related Art

Deep convolution neural networks (CNNs) have proven to be successful in machine learning tasks spanning a wide range of application domains such as, for example, object recognition, image classification, and scene understanding. Deeper and complex CNNs have been introduced to obtain higher accuracy in these applications. Supporting these CNNs while delivering high throughput on portable devices with limited battery capacity is a challenge for CNN accelerators.

The limited battery capacity problem is more pronounced in edge devices, which need to perform high-intensity real-time machine learning tasks under limited compute and energy budgets, locally.

The local on-device processing of data is needed to prevent a huge amount of raw data transfer from the edge devices to a cloud. Applications running on the edge devices such as drones, cellphones, autonomous vehicles require on-device processing to prevent latencies of data transfer to and from the cloud, and to preserve privacy of data. Most of the applications running on the edge devices involve CNNs which require power-efficient acceleration.

A direct convolution (DConv) is a compute-intensive and compute-bound operation in CNNs which has been a target for acceleration and improvement in energy efficiency. In DConv, major approaches are as follows:

Quantizing data to lower precision: By quantization, resultant multiplications and additions consume lower power and work at higher frequencies. It is shown that quantization up to 8-bit precision does not degrade the recognition accuracy significantly.

Exploiting data sparsity: The computations are accelerated by skipping ineffectual computations associated with a zero-valued input feature map (IFM) or kernel. However, the improvement in performance comes at a cost of power expensive zero-skip logic, which often consumes more power than the underlying multipliers. There is another option, where only energy may be saved without any performance improvement by switching off a number of multipliers that have one of their operands equal to zero. Kernel pruning plays an important role in increasing the sparsity of kernels for improved acceleration factor and reduction in size of a trained model.

Accordingly, there is a need for a power-efficient hybrid traversal for CNN accelerator architectures.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of providing a hybrid traversal for a convolutional neural network (CNN) accelerator architecture, the method including receiving input feature map (IFM) microbatches from a pixel memory and receiving kernel microbatches from a kernel memory, multiplying the IFM microbatches by the kernel microbatches while reusing the kernel microbatches based on a kernel reuse factor for at least one of a direct convolution (DConv) or a Winograd convolution (WgConv), to obtain output feature map (OFM) microbatches, and writing the OFM microbatches to the pixel memory, after quantization, non-linear function, and pooling on a result of the multiplying.

The IFM microbatches may be channels in a z-axial direction of one of an IFM, an OFM, and a kernel that are packed in a single memory word.

The kernel microbatches in multiplication with the IFM microbatches may be configured to reduce power consumption for the CNN accelerator architecture.

The method may be implemented on a CNN accelerator architecture with a x-y first storage.

The receiving of the IFM microbatches may include receiving the IFM microbatches using any one or any combination of a strided convolution, a dilated convolution, and a deconvolution.

In another general aspect, there is provided a hybrid traversal apparatus for a convolutional neural network (CNN) accelerator architecture, the hybrid traversal apparatus including a receiver configured to receive input feature map (IFM) microbatches from a pixel memory and to receive kernel microbatches from a kernel memory, a reuse multiplier configured to multiply the IFM microbatches by the kernel microbatches while reusing the kernel microbatches based on a kernel reuse factor for at least one of a direct convolution (DConv) or a Winograd convolution (WgConv), to obtain output feature map (OFM) microbatches, and an OFM generator configured to write the OFM microbatches to the pixel memory, after quantization, non-linear function, and pooling on a result of the multiplying.

The OFM microbatches and the IFM microbatches may be channels in a z-axial direction of one of an IFM, an OFM, and a kernel that are packed in a single memory word.

The reuse multiplier may be configured to reduce power by reusing the kernel microbatches in multiplication of the kernel microbatches and the IFM microbatches.

The hybrid traversal apparatus may be implemented on a CNN accelerator architecture with a x-y first storage.

The receiver may be configured to receive the IFM microbatches using any one or any combination of a strided convolution, a dilated convolution, and a deconvolution.

In another general aspect, there is provided a hybrid traversal apparatus for a convolutional neural network (CNN) accelerator architecture, the hybrid traversal apparatus including a receiver configured to receive input feature map (IFM) microbatches from a pixel memory and to receive kernel microbatches from a kernel memory, a transformer configured to transform the IFM microbatches by a direct convolution (DConv) or a Winograd convolution (WgConv), a reuse multiplier configured to multiply the transformed IFM microbatches by the kernel microbatches while reusing the kernel microbatches based on a kernel reuse factor, an inverse transformer configured to generate inversely transformed outputs by inversely transforming outputs of the reuse multiplier using an inverse transformation of the transformation used by the transformer, and an OFM generator configured to generate output feature map (OFM) microbatches through quantization, non-linear function, and pooling on the inversely transformed outputs and to write the generated OFM microbatches to the pixel memory.

The reuse multiplier may include a multiply-accumulate pipeline unit array (MPUA) comprising a plurality of multiply accumulate pipeline units (MPUs), wherein each of the MPUs may be configured to multiply each of the transformed IFM microbatches by the kernel microbatches.

The reuse multiplier may include multiply accumulate array (MAA) sets, wherein each of the MAA sets may be configured to multiply each of the transformed IFM microbatches by the kernel microbatches.

Other features and aspects will be apparent from the following detailed description, the drawings, and the claims.

Figure 1A:
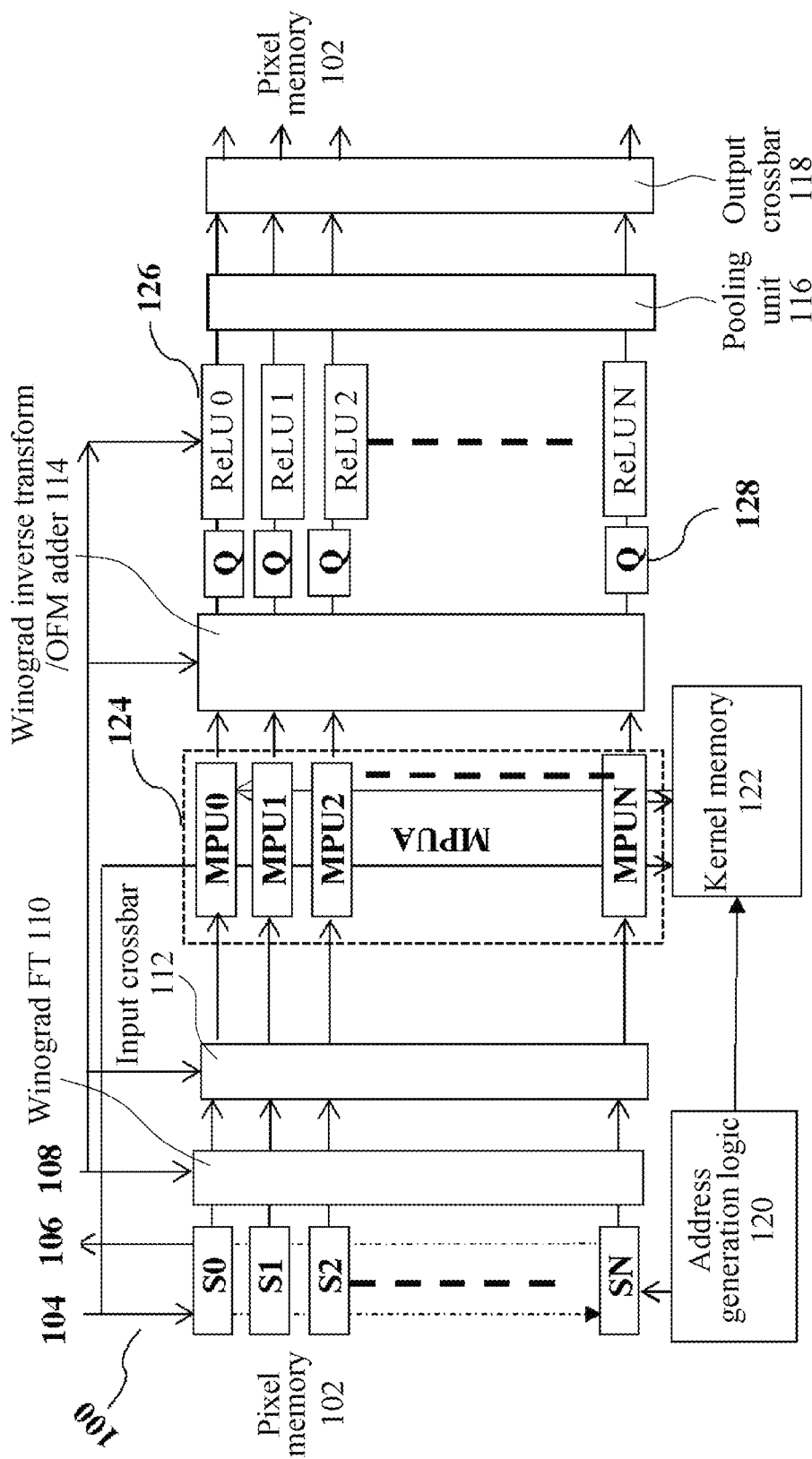
FIG. 1A illustrates an example of a baseline z-first storage convolution neural network (CNN) accelerator architecture.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like constituent elements and a repeated description related thereto will be omitted.

Figure 1B:
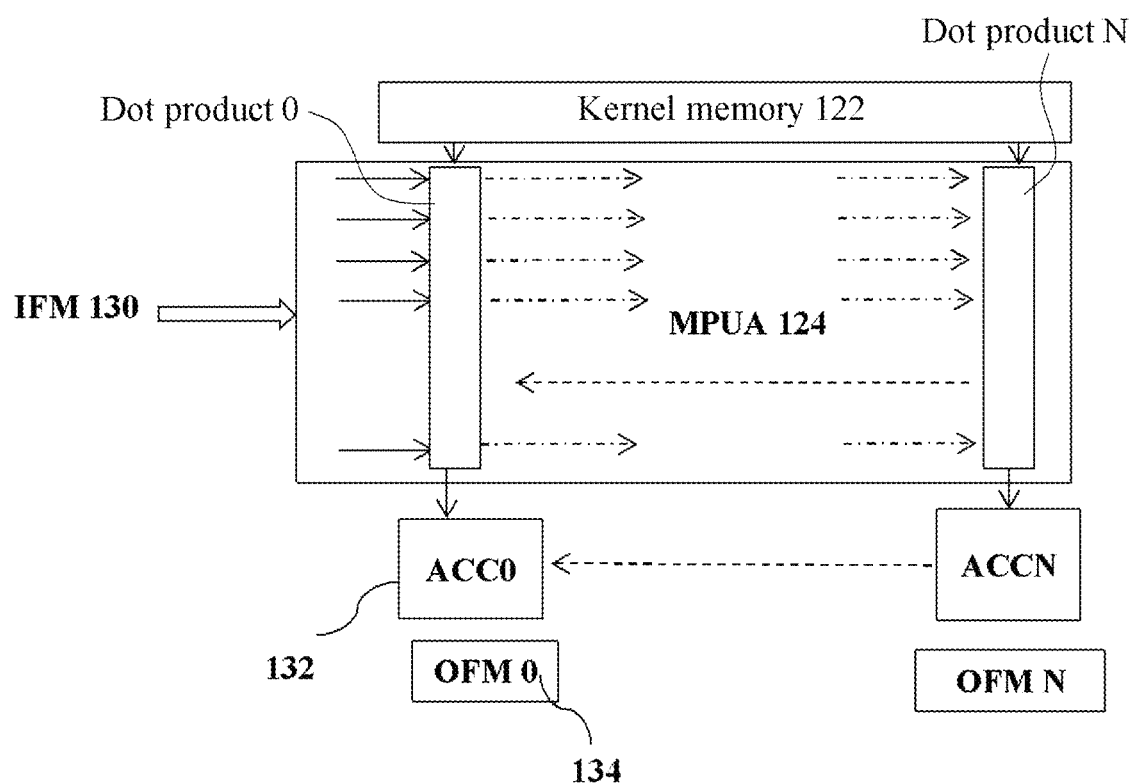
FIG. 1B illustrates an example of a multiply accumulate unit array (MPUA).

FIGS. 1A and 1B illustrate a baseline z-first storage convolution neural network (CNN) accelerator architecture 100 and multiply accumulate pipeline units (MPUs) 124. The baseline z-first storage CNN accelerator architecture 100 includes a pixel memory 102, a data input 104, a data output 106, modes 108, a Winograd forward transformation 110, an input crossbar 112, a Winograd inverse transform or output feature map (OFM) adder 114, a pooling unit 116, an output crossbar 118, an address generation logic 120, a kernel memory 122, the MPUs 124, rectified linear units (ReLUs) 126, and quantizations (Qs) 128. In an example, the baseline z-first storage CNN accelerator architecture 100 of 8-bit data precision 104 is considered. The data precision 104 includes information regarding how precisely data for an input feature map (IFM) or OFM or kernel is processed. An 8-bit baseline z-first storage CNN accelerator architecture uses the pixel memory 102 to store the IFM or the OFM, and the kernels are stored in the kernel memory 122.

The baseline z-first storage CNN accelerator architecture 100 uses one or more microbatches. The one or more microbatches are a number of channels in a z-direction of the IFM, or the OFM, or the kernel that are packed in a single memory word. The pixel memory 102 provides IFM data to a multiply accumulate pipeline unit array (MPUA) including the multiple MPUs 124. The MPUs 124 include the one or more microbatches number of parallel multipliers feeding a parallel reduction tree, followed by accumulators 132 to output OFMs 134. Each MPU 124 multiplies an input microbatch of the IFM by the kernel microbatches supplied by the kernel memory 122. The products are added using adder trees and accumulated in the OFM accumulators. Outputs from the multiple MPUs 124 are passed through the Qs 128 and the ReLUs 126, and resultant OFM pixels are written back to the pixel memory 102.

The multiple MPUs 124 are compute blocks for performing dot product operations and accumulations for convolutional or fully connected layers. The baseline z-first storage CNN accelerator architecture 100 supports a regular convolution (DConv) and a Winograd convolution (WgConv). The hybrid traversal reuses one or more kernel microbatches with one or more IFM microbatches based on a kernel reuse factor for at least one of the DConv and the WgConv.

Although FIGS. 1A and 1B show various hardware components of the baseline z-first storage CNN accelerator architecture 100, it is to be understood that the examples are not limited thereto. In other examples, the baseline z-first storage CNN accelerator architecture 100 may include fewer or a greater number of components. Further, the labels or names of the components are used only for illustrative purpose and do not limit the scope of the disclosure.

Figure 1C:
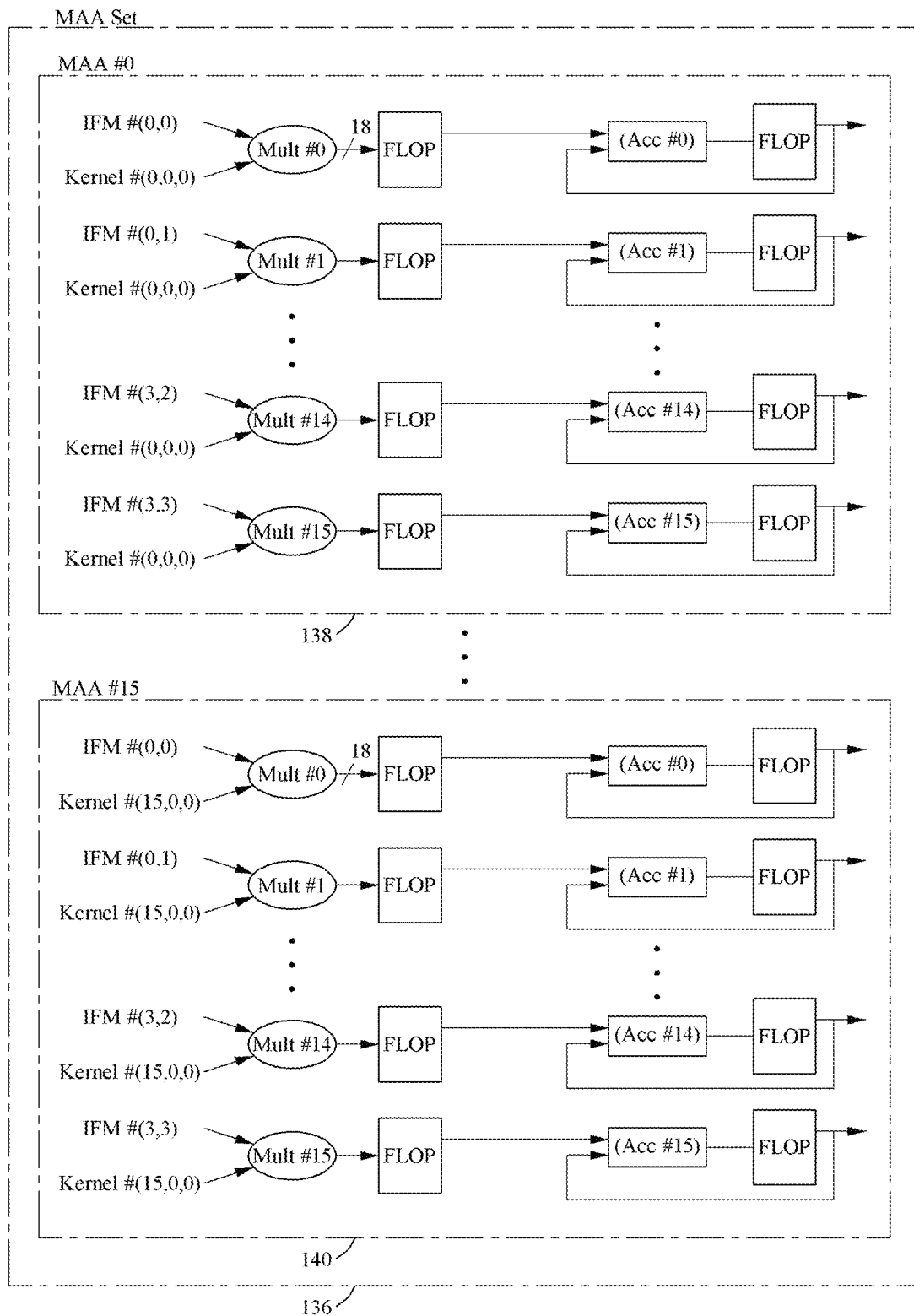
FIG. 1C illustrates an example of a baseline xy-first storage CNN accelerator architecture.

FIG. 1C illustrates an example of a baseline xy-first storage CNN accelerator architecture.

Referring to FIG. 1C, an xy-first storage CNN accelerator architecture may include a multiply accumulate array (MAA) set 136. The MAA set 136 includes 16 MAAs 138 through 140. Each MAA has 16 multiply accumulate units (MAUs). In this example, a MAU may include 16 multipliers Mult #0 to #15, 16 accumulators Acc #0 to #15, and 32 floating point operators (FLOPs).

In each MAA, a 4×4 IFM tile is multiplied by a single kernel weight as shown in FIG. 1C. The IFM is broadcasted to all the 16 MAAs, and the IFM is multiplied by the same kernel index from 16 different kernels, which contribute to 16 OFMs.

Figure 2:
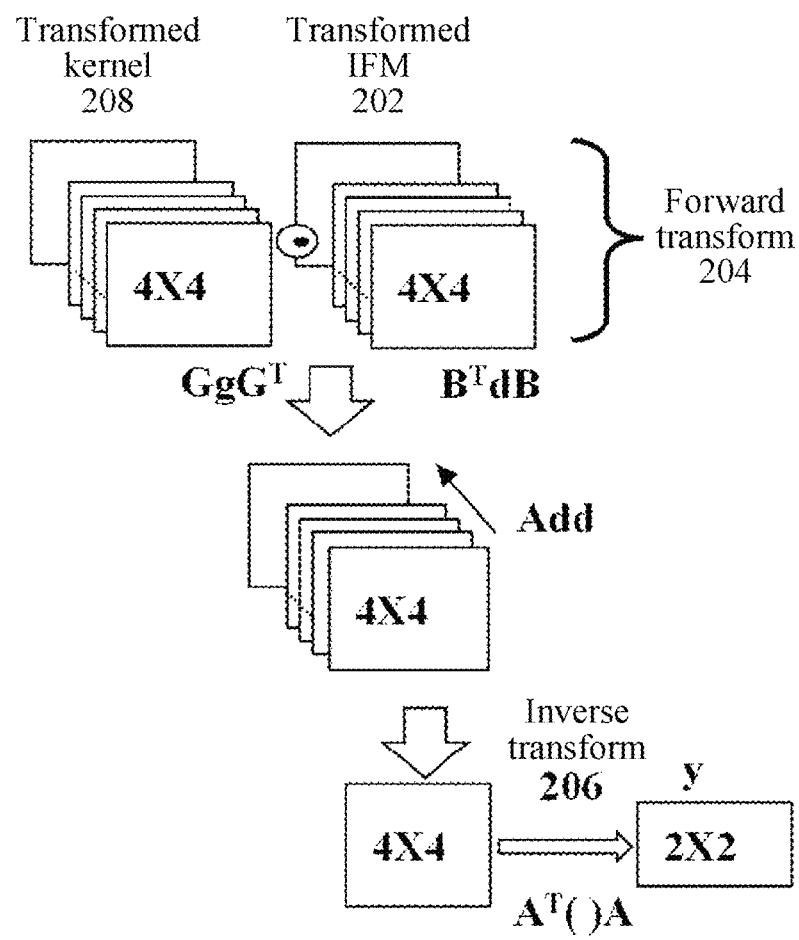
FIG. 2 illustrates an example of a 3×3 Winograd convolution (WgConv) on a baseline CNN accelerator architecture.

FIG. 2 illustrates an example of a 3×3 WgConv on a baseline CNN accelerator architecture.

Referring to FIG. 2, in a 3×3 WgConv, a transformed IFM 202 is divided into 4×4 IFM blocks, and a transformed kernel 208 is divided into 4×4 kernel blocks. For a forward transform 204 of the IFM blocks, all the pixels in x-y plane from the same channel of the IFM blocks need to be accessed in parallel. To facilitate this, microbatches from individual x-y location under every 4×4 IFM block are stored in different banks of the pixel memory 102. Hence, 16 different banks of the pixel memory are used. The same pattern is followed for all the IFM channels. A Winograd forward transform module receives 4×4×16 IFM blocks in parallel from S0 to S15, and produces 4×4×16 transformed IFM blocks, which are distributed among 16 MPUs as 1×1×16 microbatches. As the independent element-wise operations are distributed to different MPUs, the same MPU data path realizing dot product operations used in a DConv may be applied here without modifications. Here, the IFM microbatches are multiplied by the corresponding 16 kernel microbatches to produce 16 partial OFM microbatches. The same computations are repeated until all the IFM channels are consumed, and the results are accumulated. Finally, the 16 microbatches, which correspond to 16 channels of the 4×4 partial OFMs, are taken through a Winograd inverse transform module to get a 2×2×16 OFM block. The Winograd inverse transform is given as Equation 1.

$$y = A^T[(GgG^T) \odot (B^T dB)]A \qquad \text{[Equation 1]}$$

The WgConv reduces the number of multiplications in a 3×3 convolution by 2.25 times. The WgConv requires 4×4 pixels from an IFM block to be fetched in parallel. To meet this requirement, a data layout in the IFM memory is changed for layers performing the WgConv. Traversals for both modes 108 of convolution utilize compute resources (for example, multiply accumulates (MACs)) at 100% resource efficiency.

Figure 3A:
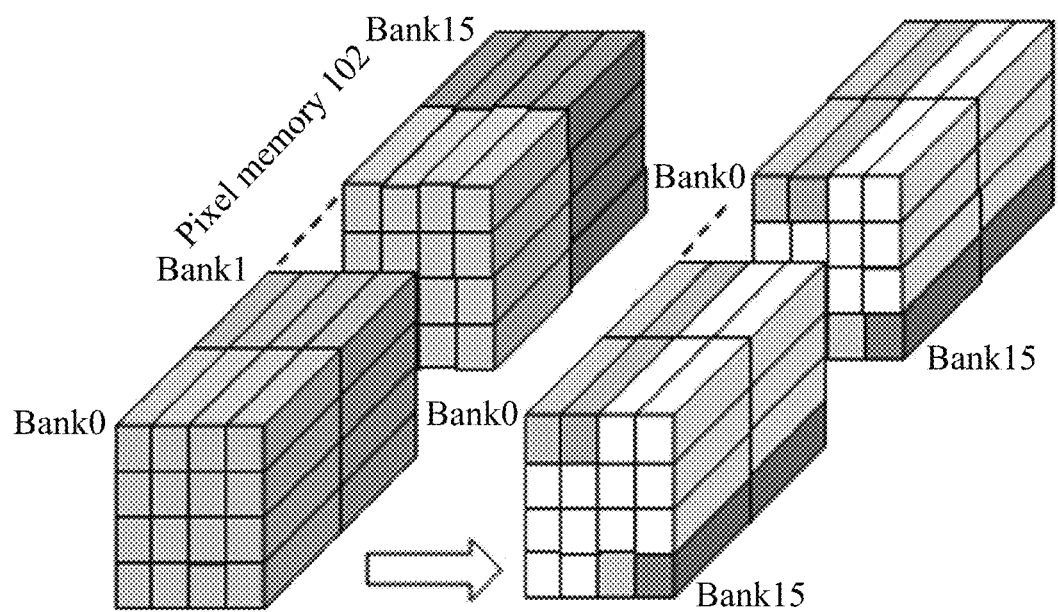
FIG. 3A illustrates an example of a data layout for a direct convolution (DConv) and a WgConv on a baseline CNN accelerator architecture.
Figure 3B:
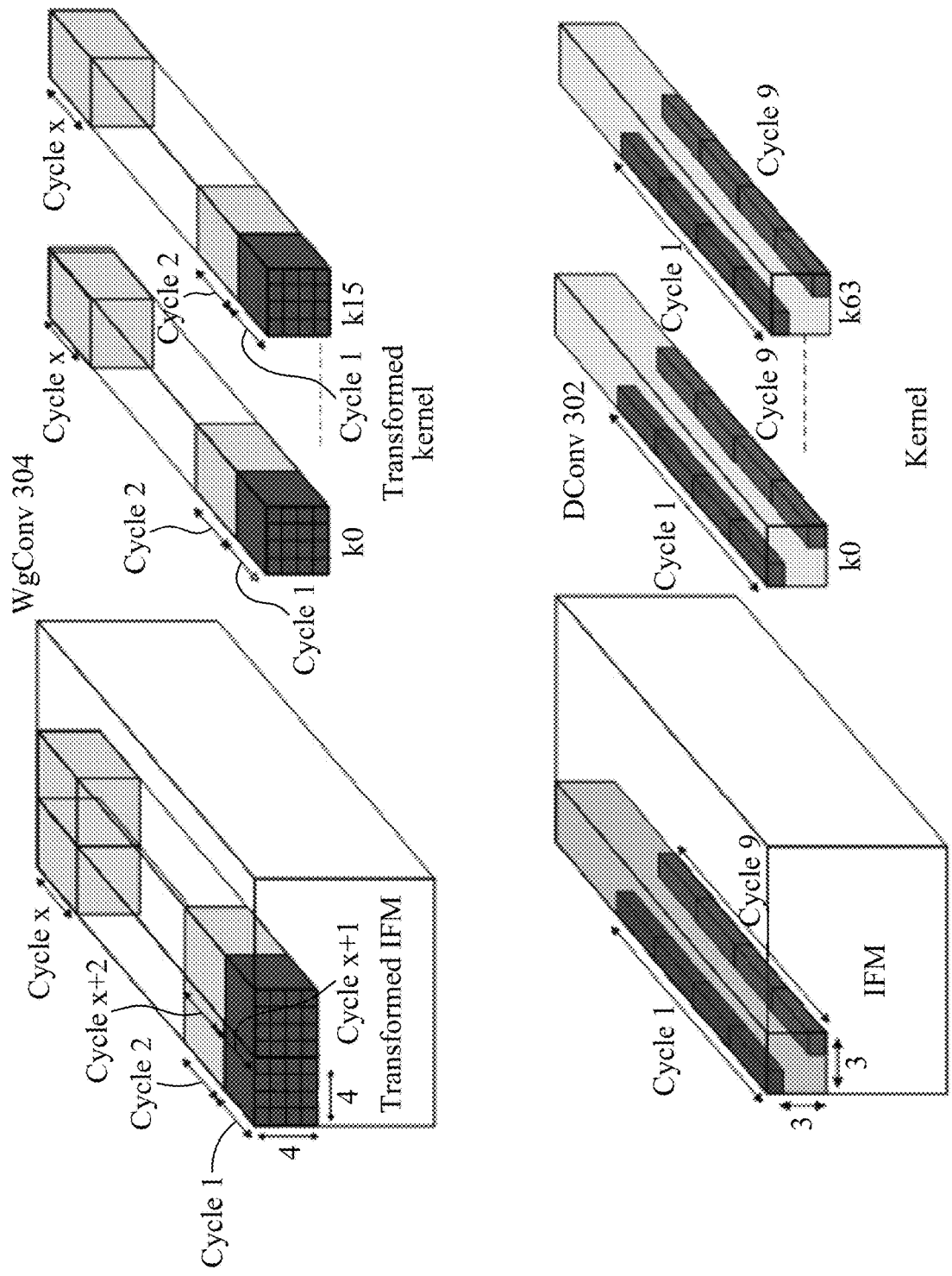
FIG. 3B illustrates an example of a data traversal for a DConv and a WgConv on a baseline CNN accelerator architecture.

FIGS. 3A and 3B illustrate examples of a data layout and a data traversal for a DConv and a WgConv on a baseline CNN accelerator architecture. An 8-bit baseline architecture is modified with minimal architectural changes to support both a DConv 302 and a WgConv 304, to come up with a fused data path architecture, called WinDConv architecture. To realize the fused data path, the number of pixel memory banks and the number of MPUs are equal to 16. In an example, each of the pixel memory banks S0 to S15 is of 128 kB size with 128-bit word length. In an example, each of 16 MPUs includes 256 multipliers, 16 reduction adder trees, and 16 accumulators. Thus, the overall architecture includes 4096 8-bit multipliers. In an example, 16 SRAM banks of size 64×128 bits each, termed kernel memories, supply kernel data to all MPUs. In an example, the kernel data are multiplied by input IFM microbatches, shared across all columns, generating 16 OFMs (one OFM microbatch) in parallel. In an example, the outputs of the MPUs are selectively added using an OFM adder tree. In an example, to support a WgConv, a Winograd forward transform (WFT) unit is introduced after the pixel memory. In an example, the OFM adder tree is reconfigured to support a Winograd inverse transform function for the WgConv. The generated OFM is passed through the quantizations (Qs) 128 and the ReLUs. In an example, the resultant OFMs after the pooling unit 116 are written back to the pixel memory banks in a pattern specific to the mode of operation (DConv or WgConv).

For the DConv, a sequential access of IFM microbatches under every IFM window is needed for convolution. Therefore, in an example, an IFM is divided into batches of 16 channels that are stored in separate pixel memory banks. As the WgConv mode produces a 4×16 OFM block, a hybrid traversal for DConv is designed such that an OFM block of the same dimensions appears at the output. To realize this, in an example, each IFM microbatch from a pixel memory bank is shared with four MPUs. Thus, four microbatches from four active pixel memory banks provide IFM data to 16 MPUs to generate 64 intermediate OFMs in parallel. The same computations are repeated, and the results accumulated for x-y positions of IFM, based on the kernel dimensions (for example, 9 positions for a 3×3 kernel), generate 64 intermediate OFM pixels. In an example, these pixels generated from 4 IFM batches are added together to get an OFM microbatch. In an example, such four OFM microbatches are generated together and written back to the pixel memory.

Figure 4A:
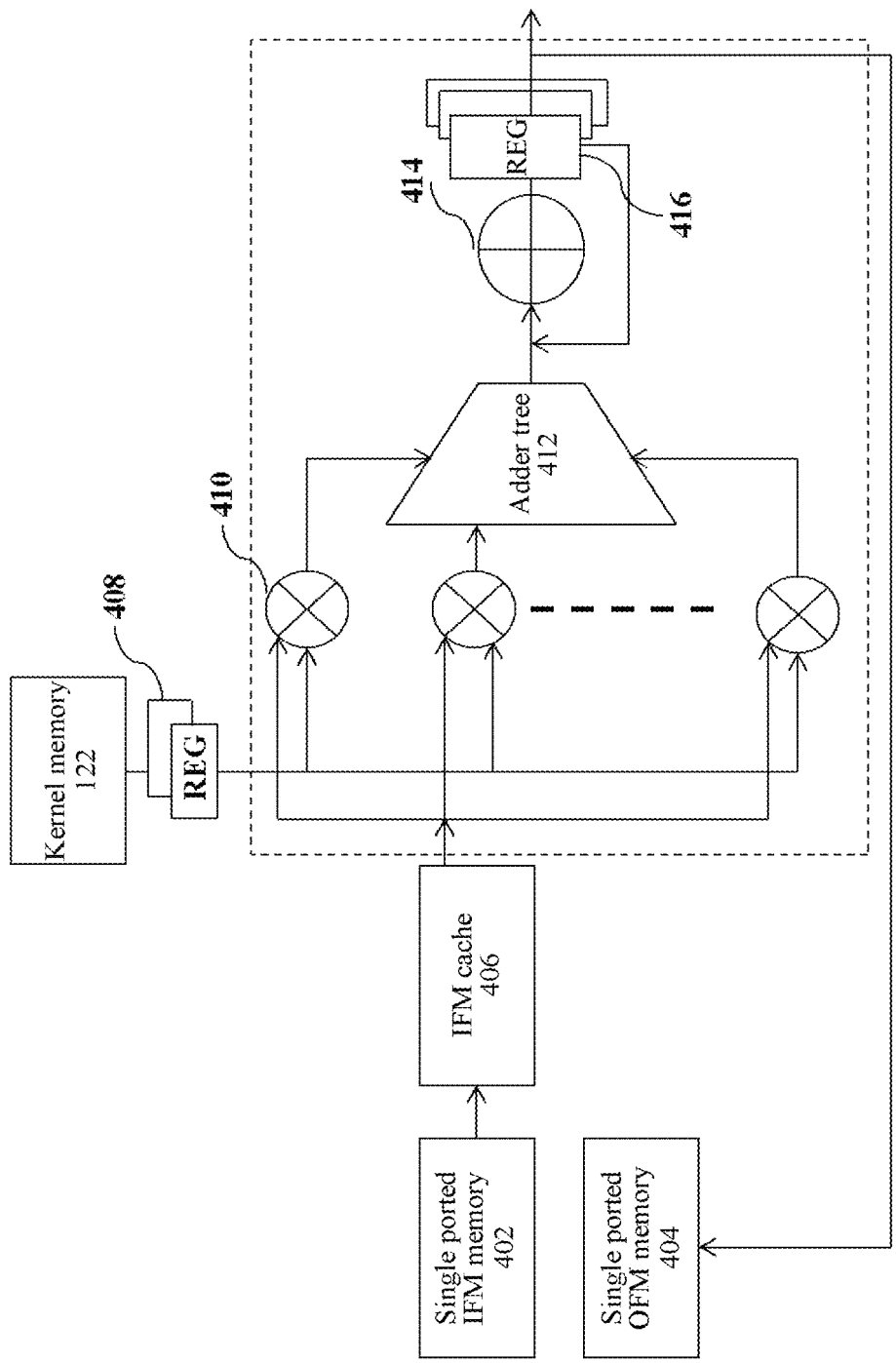
FIG. 4A illustrates an example of a structure of a dot product model in a single column of multiply accumulate units (MPUs) for a power saving scheme using additional accumulator registers and kernel registers in a baseline z-first storage CNN accelerator architecture.

FIG. 4A illustrates an example of a structure of a dot product model in a single column of multiply accumulate units (MPUs) for a power saving scheme using additional accumulator registers and kernel registers in a baseline z-first storage CNN accelerator architecture.

A dot product includes the kernel memory 122, a single ported IFM memory 402, a single ported OFM memory 404, an IFM cache 406, registers 408, multipliers 410, an adder tree 412, an adder 414, and multiple accumulator registers 416. The dot product uses optimizations of a scheme 2 and introduces newer optimizations like a kernel cache for kernel reuse, and multiple accumulators in the MPUs 124 to compute multiple OFMs for each kernel value. Reduction in kernel reads due to kernel reuse in the MPUs 124 results in a reduction of up to 2.8 times in the total power compared to the baseline architecture of a scheme 1 for DConv.

The scheme 1 uses the register clock gating alone for power savings. No change in traversal happens. The register clock gating provides about a 20% reduction in power. The scheme 2 uses the IFM cache 406 to increase IFM reuse along with the register clock gating of the scheme 1. In an existing z-direction storage CNN accelerator architecture, the IFM value is broadcasted across multiple kernels. Since the IFM is broadcasted to multiple columns, the number of IFM reads is much lower than the number of kernel reads. Due to the lower number of IFM reads, IFM reuse may give a decrease of up to 2% in the total power.

The dot product shows significant improvements in the power of about 2.8 times and 2.1 times over the second traversal in the DConv and the WgConv, respectively. The significant improvements are mainly due to the reuse of kernels, which reduces the number of kernel memory accesses by a kernel reuse factor without increasing the area.

Figure 4B:
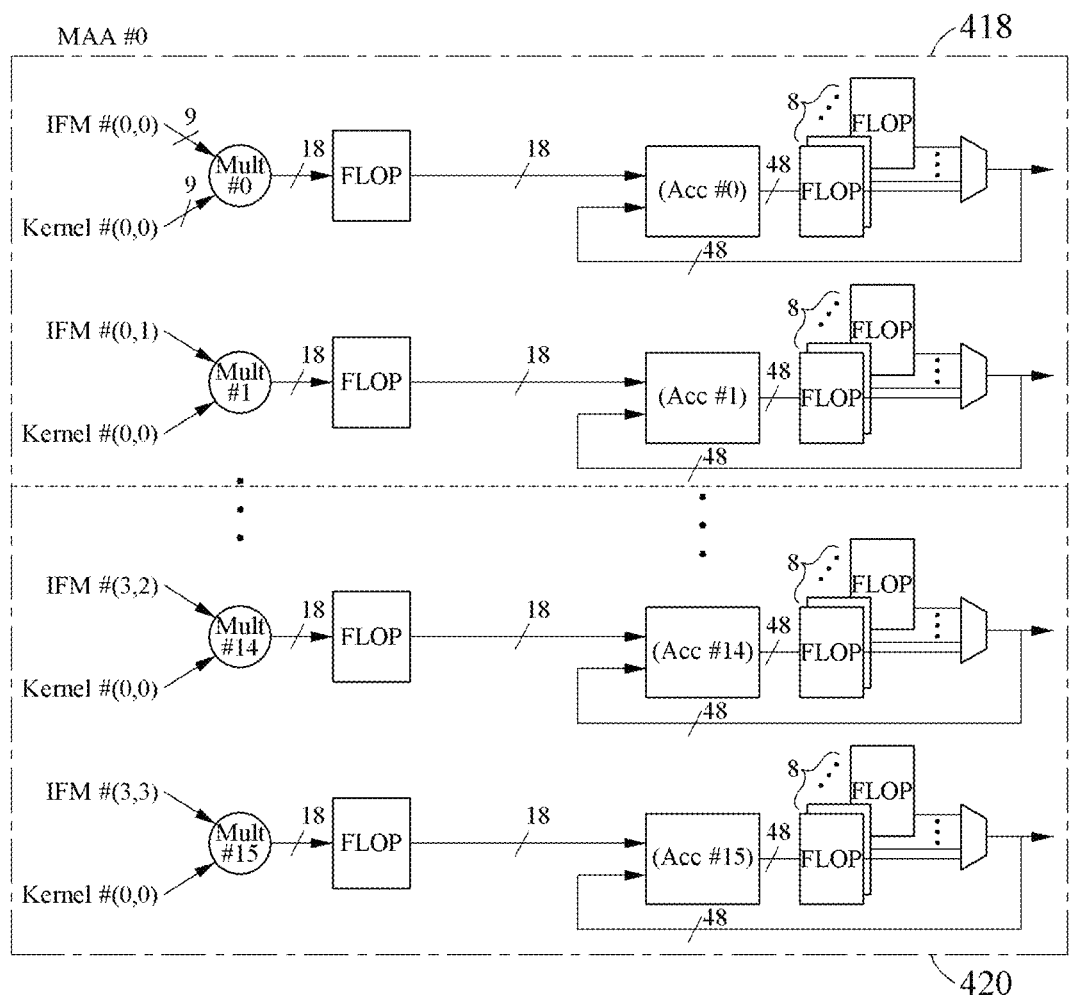
FIG. 4B illustrates an example of a hybrid traversal for a baseline xy-first storage CNN accelerator architecture.

FIG. 4B illustrates an example of a hybrid traversal for a baseline xy-first storage CNN accelerator architecture. A hybrid traversal may be introduced in MAAs 418 through 420 by adding 7 extra accumulators for each multiplier in MAU and multiplexer network to select one of the 8 accumulators for updating the MAAs 418 through 420. After the introduction of the extra accumulators in MAUs, each kernel weight is used to be multiplied by 8 different IFM pixels and by keeping the kernel element fixed across 8 cycles. For example, considering a cell size of 4×4, a single kernel weight is multiplied by 128 IFM pixels across 8 cycles. Due to the additional accumulators for each of the multipliers, a kernel fetched is reused for 8 cycles.

Figure 5A:
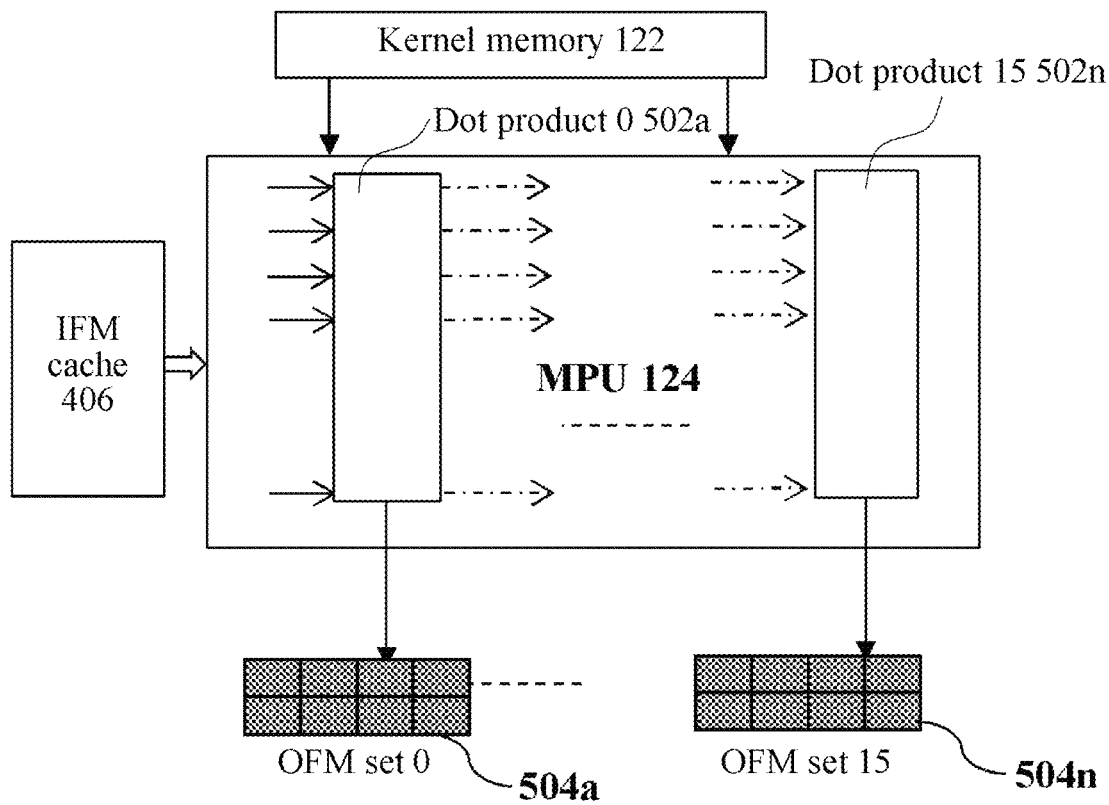
FIG. 5A illustrates an example of a hybrid traversal for a z-first storage CNN accelerator architecture with 8 accumulator registers per column for kernel reuse.
Figure 5B:
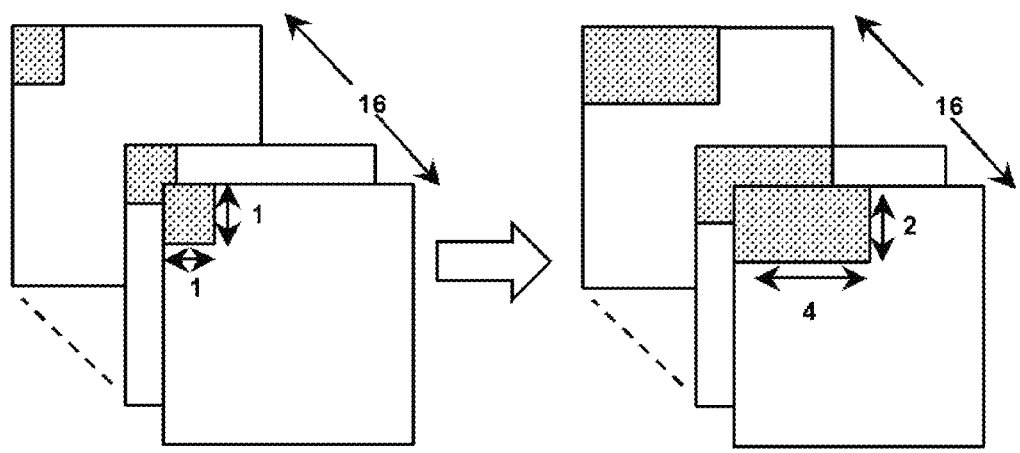
FIG. 5B illustrates an example of a corresponding change in an output feature map (OFM) computation order due to a hybrid traversal for a z-first storage CNN accelerator architecture.

FIGS. 5A and 5B illustrate examples of a hybrid traversal for a z-first storage CNN accelerator architecture with 8 accumulator registers per column for kernel reuse and a corresponding change in an OFM computation order due to the hybrid traversal. A hybrid traversal for a z-first storage architecture includes the kernel memory 122, the IFM cache 406, dot product modules 502a through 502n, and accumulator register sets 504a through 504n. In the improved MPUs 124, multiple accumulators are introduced under columns of the MPUs 124. Each kernel is multiplied by multiple IFM pixels, and the accumulator registers are updated in sequence. Each column accumulates two or more OFMs. The OFM computation order is changed due to the hybrid traversal, and the OFM computation order is shown in FIG. 5B.

Figure 6:
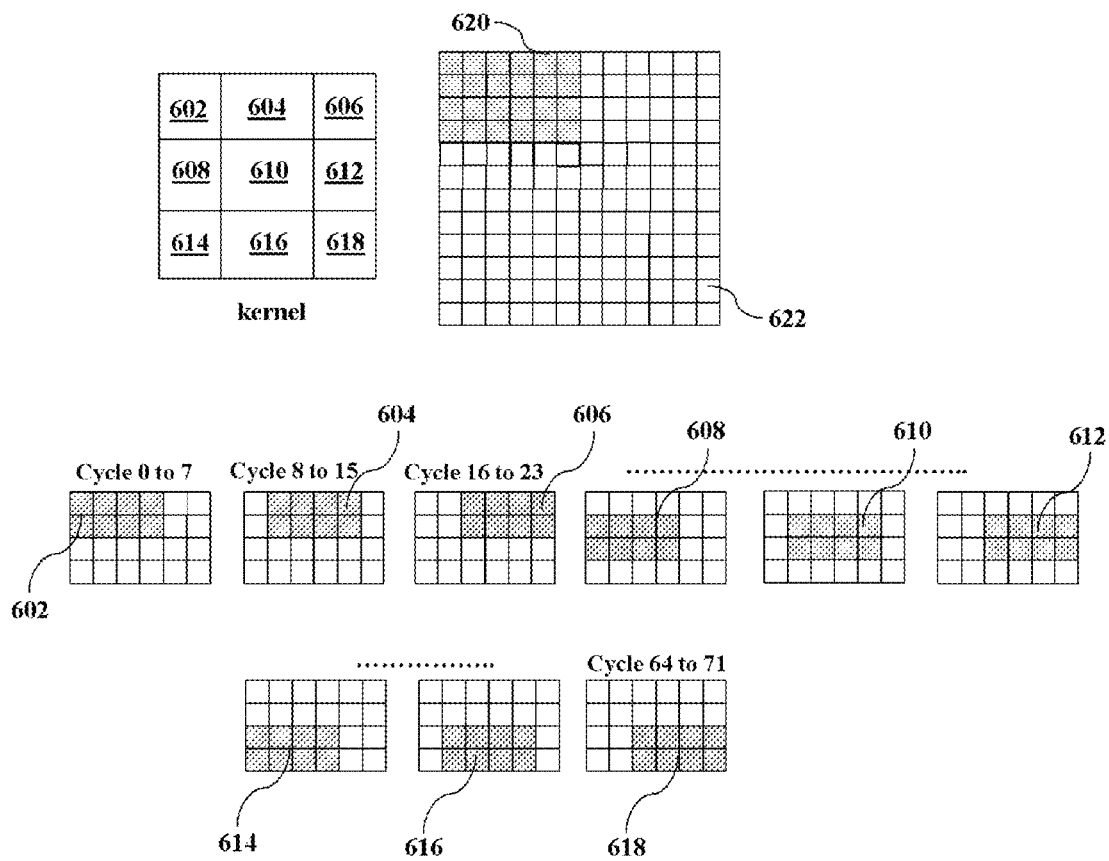
FIG. 6 illustrates an example of a DConv with 2×4 accumulators.

FIG. 6 illustrates an example of a DConv with 2×4 accumulators. For example, a 4×6 IFM block is read to an IFM buffer 620. A plurality of kernel values 602 through 618 are multiplied by the IFM. Each kernel value is multiplied by 8 IFM values sequentially. Thus, to compute 8 OFMs for a 3×3 kernel, the baseline z-first storage CNN accelerator architecture 100 takes 8×9=72 cycles. Although the number of accumulators is increased from the baseline, the overall number of register updates remains the same per cycle. Hence, there will be a slight increase in area, but not much increase in power. The corresponding traversal is a hybrid of output and weight stationary traversals. For example, for a cycle 0 to 7, a first kernel value 602 is multiplied by a 2×4 block of an IFM buffer 622. For a cycle 8 to 15, a second kernel value 604 is multiplied by a first shifted 2×4 block of the IFM buffer 622. For a cycle 16 to 23, a third kernel value 606 is multiplied by a second shifted 2×4 block of the IFM buffer 622. For a cycle 64 to 71, a ninth kernel value 618 is multiplied by a ninth shifted 2×4 block of the IFM buffer 622.

Figure 7A:
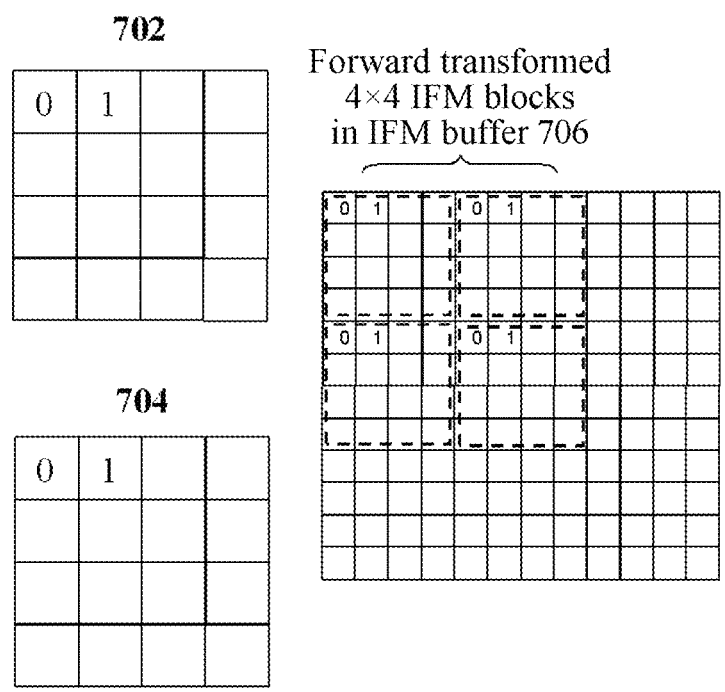
FIG. 7A illustrates an example of a WgConv with 2×4 accumulators.

FIG. 7A illustrates an example of a WgConv with 2×4 accumulators. For example, a hybrid traversal to completely utilize 8 accumulator registers provided for a DConv mode is considered. An 8×8 IFM block is read to the IFM buffer. An additional kernel register for reuse is introduced, and buffered transformed IFM pixels are multiplied by elements from two transformed kernels. The corresponding traversal is a hybrid of input, output and weight stationary traversals. The kernel reuse factor is halved, and the IFM reuse factor is doubled compared to the DConv.

Figure 7B:
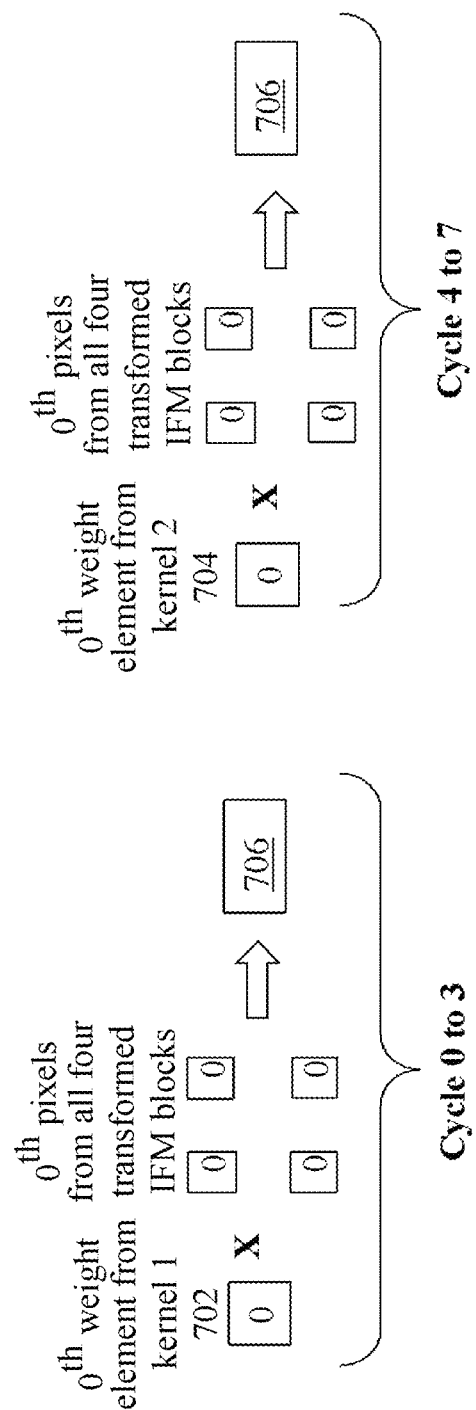
FIG. 7B illustrates an example of a sequence of operations in a hybrid traversal for a WgConv.

FIG. 7B illustrates an example of a sequence of operations in a hybrid traversal for a WgConv. The sequence of operations in MPU0 shows that a $0^{th}$ weight element from a kernel 702 is multiplied by $0^{th}$ pixels from all four transformed IFM blocks, and then accumulators 0 to 3 are updated sequentially for a cycle 0 to 3. A 0th weight element from a kernel 704 is multiplied by 0th pixels from all four transformed IFM blocks, and then accumulators 4 to 7 are updated sequentially for a cycle 4 to 7. The kernel 702 is multiplied by a $0^{th}$ pixel of the transformed 4×4 kernel, and the multiplication is performed in MPU0. Multiplication with a 1st kernel pixel is performed in MPU1 until multiplication with a 15th kernel pixel is performed in MPU15.

For example, a hybrid traversal pseudo code for a 3×3 convolution may be as given below:

```
// (a) HYBRID TRAVERSAL DConv
FOR (K=0; K<NOFM; K++)                                          //NUMBER OF OFMS
  FOR (C=0; C< N_CH_IFM/16; C++)                                //NUMBER OF MICROBATCHES
    FOR (I=0; I<NROW_OFM; I=I+4)                                //OFM HEIGHT
      FOR (J=0; J< NCOL_OFM; J=J+2)                             //OFM WIDTH
        FOR (K1=0; K1<3; K1++)                                  //KERNEL HEIGHT
          FOR (K2=0; K2<3; K2++)                                //KERNEL WIDTH
            FOR (T1=0; T1<4;T1++)                               //PARTIAL OFM ROWS
              FOR (T2=0; T2<2; T2++)    //PARTIAL OFM COLUMNS
                FOR (C1=0; C1< 16; C1++)//MICROBATCH
                  OFM(K,I+T1,J+T2) = OFM(K,I+T1,J+T2)
                  + IFM(C,I+T1+K1,J+T2+K2)*KER(K,C,K1,K2)

// (b) HYBRID TRAVERSAL WgConv
FOR (K=0; K<NOFM; K=K+2)                                        //NUMBER OF OFMS
  FOR (C=0; C<N_CH_IFM/16; C++)                                 //NUMBER OF MICROBATCHES
    FOR (I=0; I<NROW_OFM; I=I+4)                                //OFM HEIGHT
      FOR (J=0; J<NCOL_OFM; J=J+2)                              //OFM WIDTH
        FOR (K1=0; K1<4; K1++)                                  //TRANSFORMED KERNEL HEIGHT
          FOR (K2=0; K2<4; K2++)                                //TRANSFORMED KERNEL WIDTH
            FOR (S=0; S<2; S++)                                 //TWO KERNEL REGISTERS
              FOR (T1=0; T1<2;T1++)                             //PARTIAL OFM ROWS
                FOR (T2=0; T2<2; T2++)                          //PARTIAL OFM COLUMNS
                  FOR (C1=0; C1<16; C1++)//MICROBATCH
                    OFM(K+S,I+T1,J+T2) = OFM(K+S,I+T1,J+T2)
                    + IFM(C,I+T1+K1,J+T2+K2)*KER(K+S,C,K1,K2)
```

The hybrid traversal for the 3×3 convolution includes: (a) a hybrid traversal for a DConv that has an OFM in an outer loop and a kernel in an inner loop similar to an output stationary traversal, where in addition, due to computation of partial OFM pixels of a single channel, two additional loops are introduced inside the kernel loop, making it partial weight stationary under the output stationary traversal; and (b) a hybrid traversal for a WgConv that has three additional loops due to computation of partial OFM pixels of two channels.

Figure 8:
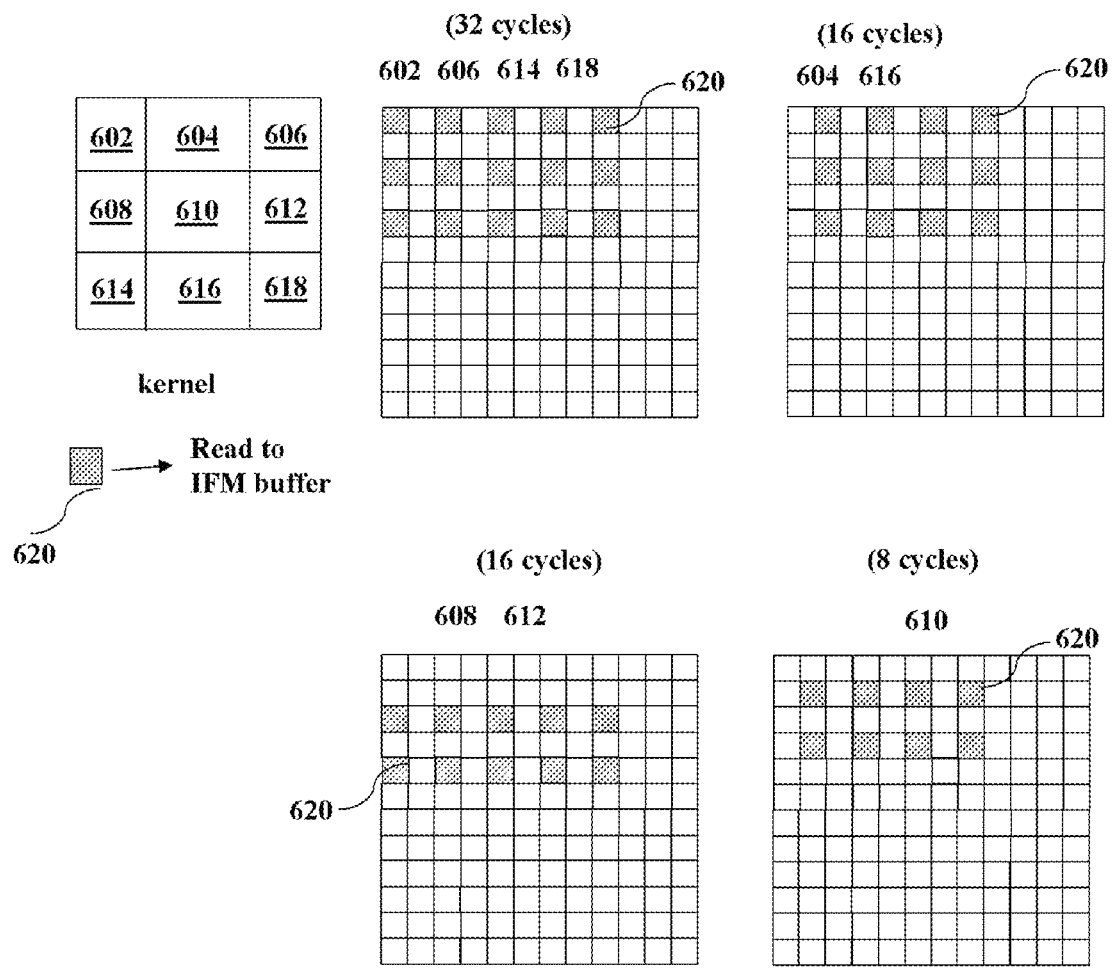
FIG. 8 illustrates an example of a strided convolution using a hybrid traversal.

FIG. 8 illustrates an example of a strided convolution using a hybrid traversal. In a strided convolution, stride factors are considered while reading an IFM to the IFM buffer 620. The plurality of kernel values 602 through 618 are multiplied by the IFM read into the IFM buffer. For example, considering a 3×3 stride convolution 2, first reading alternate pixels of the IFM enables multiplication of the read pixels with corner pixels of a 3×3 kernel. The idea is to reuse the read pixel in the IFM buffer to the maximal extent. Each kernel element is multiplied by 8 IFMs in sequence (similar to the DConv). Similarly, IFMs corresponding to other kernel elements are read into IFM buffers and reused. IFM reuse is stride dependent. For example, for a 3×3 kernel of a stride convolution 3, IFM reuse is lesser. If the stride convolution is greater than the kernel w/h, IFM reuse may not be possible.

Figure 9:
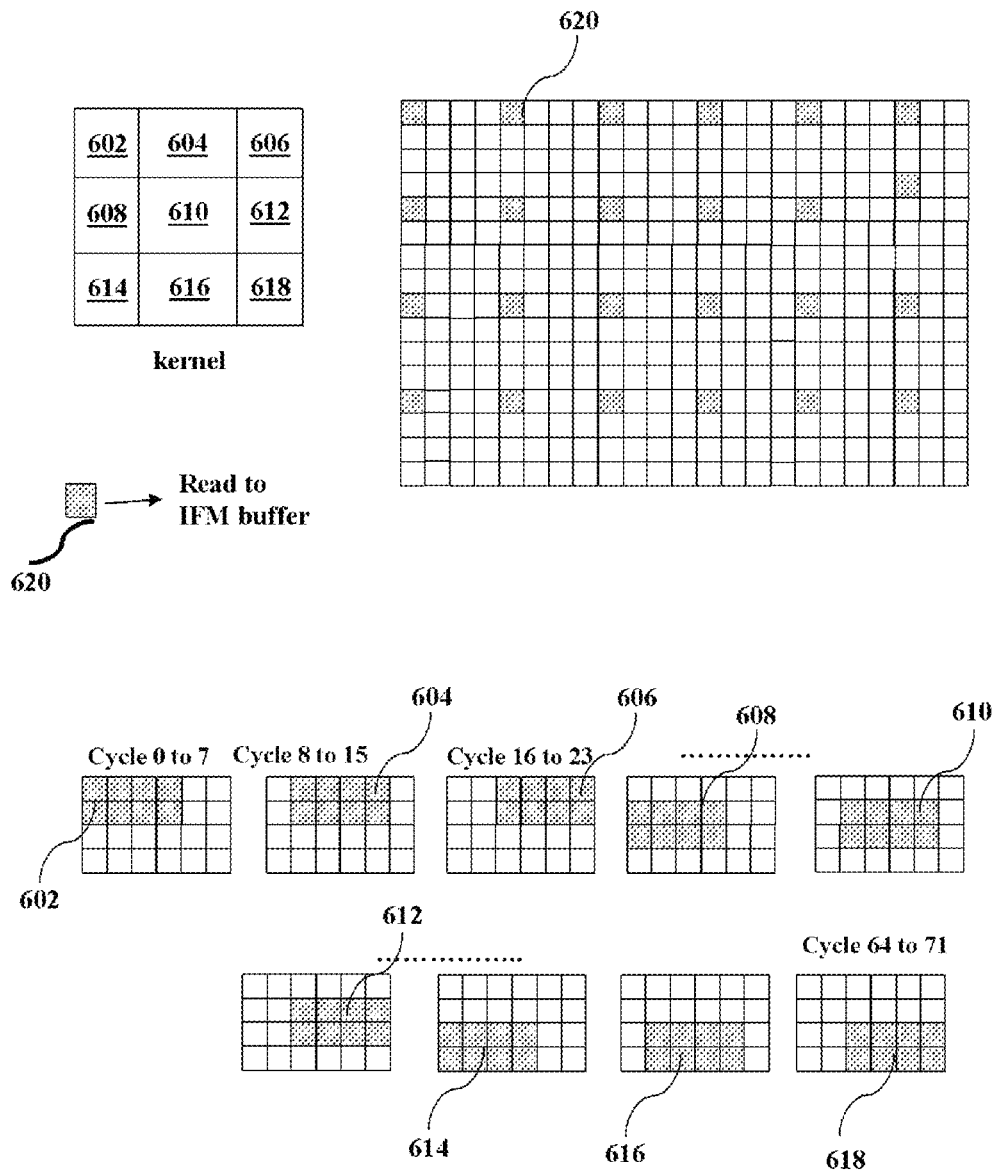
FIG. 9 illustrates an example of a dilated convolution using a hybrid traversal.

FIG. 9 illustrates an example of a dilated convolution using a hybrid traversal. In a dilated convolution, pixels separated by a dilation factor are read to an IFM buffer. The plurality of kernel values 602 through 618 are multiplied by the IFM read into the IFM buffer. In the dilated convolution, multiplications similar to a DConv are performed on the read pixels in the IFM buffer to produce OFMs separated by the dilation factor. Next, the adjacent pixels to the already fetched IFMs are read to compute corresponding OFMs. For cases where a stride convolution is greater than 1, an address generation logic may be accordingly modified to fetch pixels with offset=dilation_factor*stride.

Figure 10:
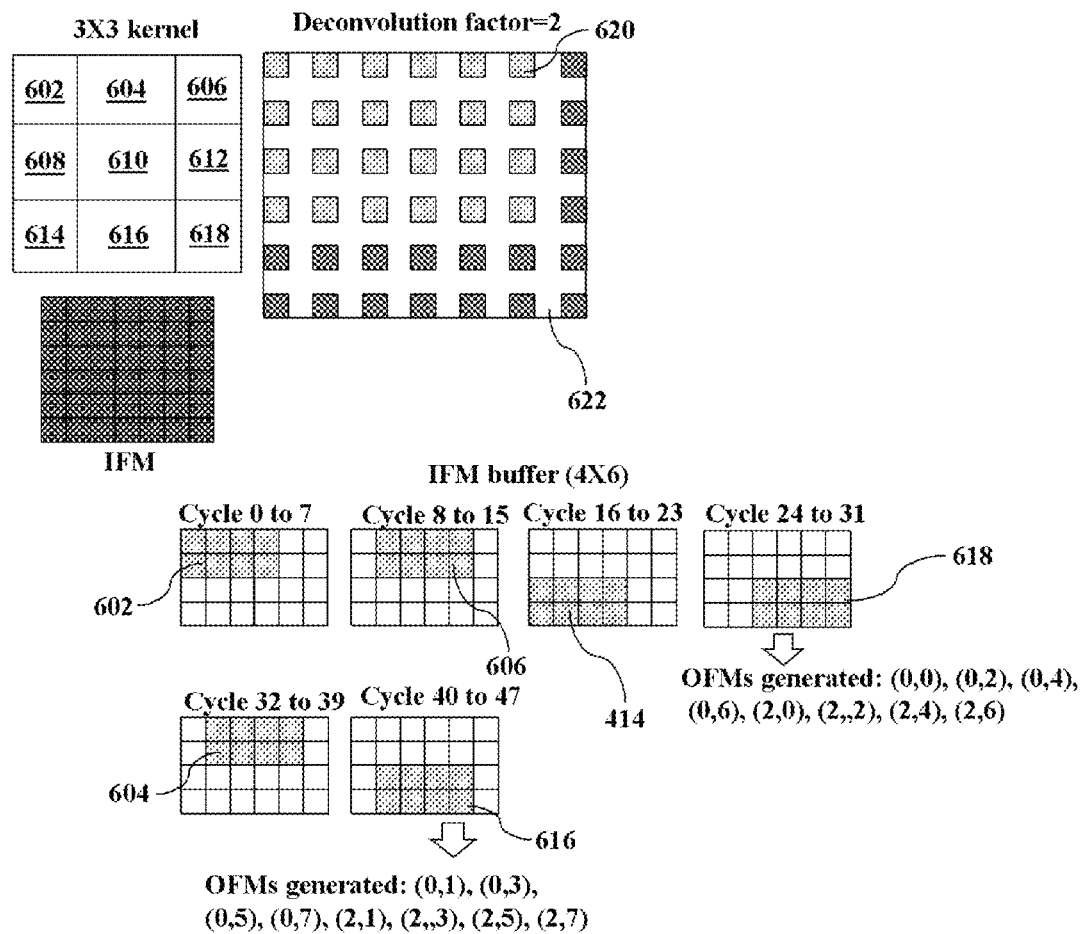
FIG. 10 illustrates an example of a deconvolution using a hybrid traversal.

FIG. 10 illustrates an example of a deconvolution using a hybrid traversal. The plurality of kernel values 602 through 618 are multiplied by the IFM read into the IFM buffer. A deconvolution requires an IFM to be enlarged by a deconvolution factor, and then a convolution is performed similar to a DConv. Here, for a given deconvolution factor, only an accumulator corresponding to nonzero IFM pixels needs to be updated. Selected kernel elements are multiplied by multiple IFM pixels to get OFMs separated by the deconvolution factor. The index of a kernel element that needs to be read from the kernel memory 122 follows a sequence, and may be derived from a simple state machine, the index being common to all MPUs in an MPUA at any instance. For example, for a cycle 0 to 7, the first kernel value 602 is multiplied by a 2×4 block of the IFM buffer 622. For a cycle 8 to 15, a kernel value 2 is multiplied by a 2×4 block shifted by 1 pixel in an x direction. For a cycle 16 to 23, the third kernel value 614 is multiplied by the shifted 2×4 block of the IFM buffer 622. For a cycle 24 to 31, the fourth kernel value 618 is multiplied by a shifted 2×4 block of the IFM buffer 622. For a cycle 32 to 39, the fifth kernel value is multiplied by a shifted 2×4 block of the IFM buffer 622. For a cycle 40 to 47, the sixth kernel value 616 is multiplied by a shifted 2×4 block of the IFM buffer 622.

Figure 11:
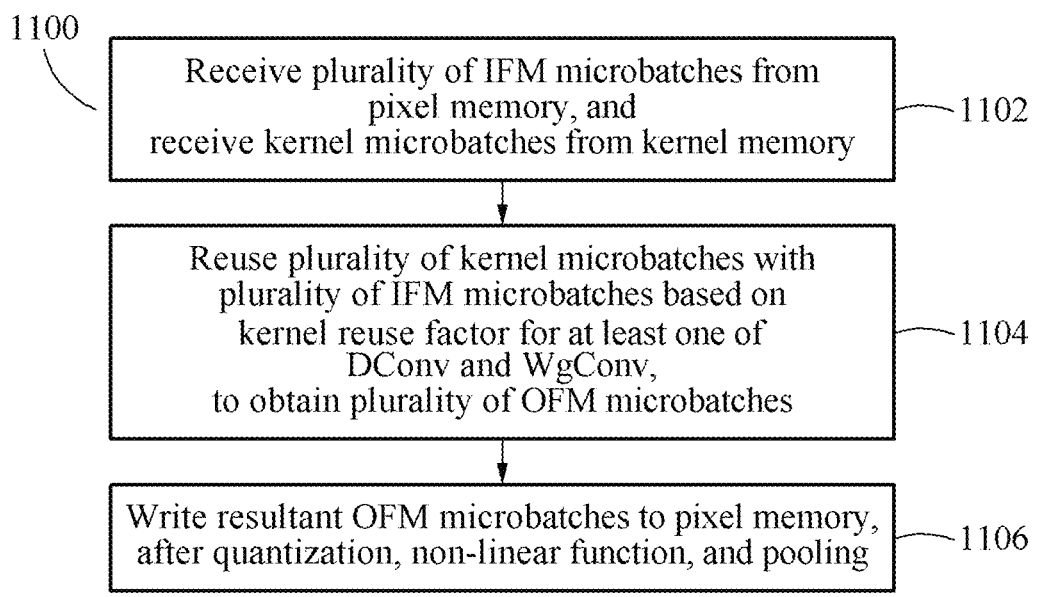
FIG. 11 illustrates an example of a method for providing a hybrid traversal for a CNN accelerator architecture.

FIG. 11 illustrates an example of a method for providing a hybrid traversal for a CNN accelerator architecture. The operations in FIG. 11 may be performed in the sequence and manner as shown, although the order of some operations may be changed or some of the operations omitted without departing from the spirit and scope of the illustrative examples described. Many of the operations shown in FIG. 11 may be performed in parallel or concurrently. One or more blocks of FIG. 11, and combinations of the blocks, can be implemented by special purpose hardware-based computer, such as a processor, that perform the specified functions, or combinations of special purpose hardware and computer instructions. In addition to the description of FIG. 11 below, the descriptions of FIGS. 1-10 are also applicable to FIG. 11, and are incorporated herein by reference. Thus, the above description may not be repeated here.

In operation 1102, a plurality of IFM microbatches may be received from a pixel memory and kernel microbatches may be received from a kernel memory. In operation 1104, the plurality of kernel microbatches may be reused with the plurality of IFM microbatches based on a kernel reuse factor for at least one of a DConv and a WgConv, to obtain a plurality of OFM microbatches. In operation 1106, resultant OFM microbatches may be written to the pixel memory, after quantization, non-linear function, and pooling.

Figure 12:
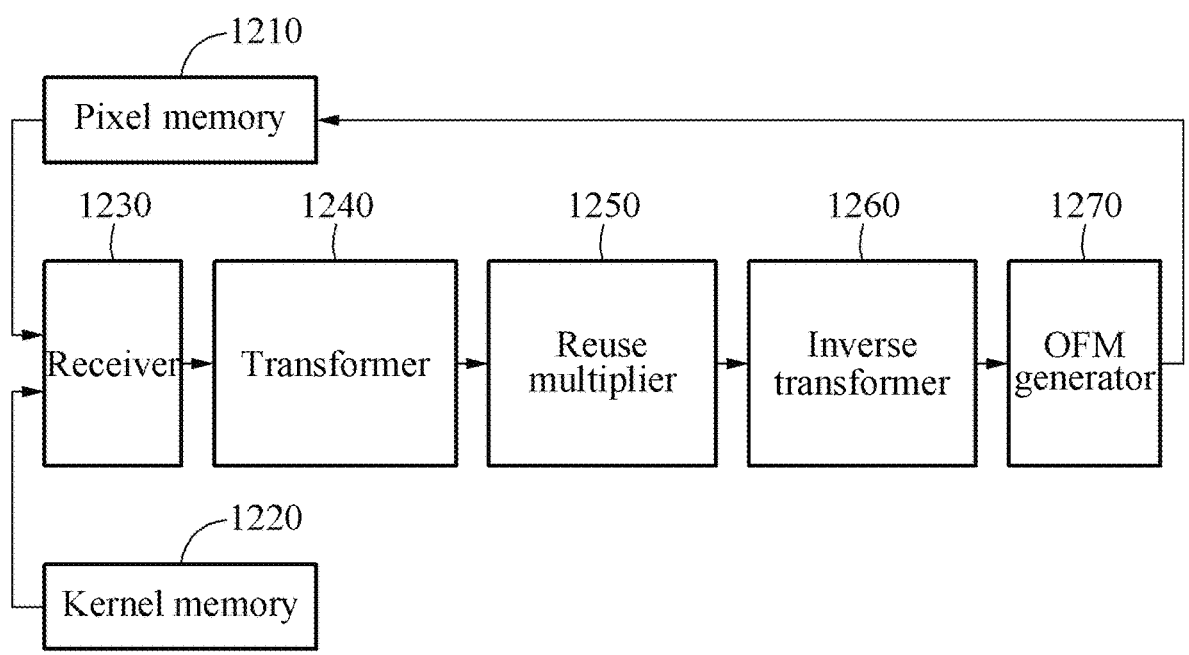
FIG. 12 illustrates an example of a configuration of a hybrid traversal apparatus for a CNN accelerator architecture.

FIG. 12 illustrates an example of a configuration of a hybrid traversal apparatus for a CNN accelerator architecture. Referring to FIG. 12, a hybrid traversal device includes a pixel memory 1210, a kernel memory 1220, a receiver 1230, a transformer 1240, a reuse multiplier 1250, an inverse transformer 1260, and an OFM generator 1270.

The receiver 1230 receives a plurality of IFM microbatchs from the pixel memory 1210 and receives a plurality of kernel microbatches from the kernel memory 1220.

The transformer 1240 transforms the plurality of IFM microbatches by a DConv or a WgConv.

The reuse multiplier 1250 multiplies the plurality of transformed IFM microbatches by the plurality of kernel microbatches while reusing the plurality of kernel microbatches based on a kernel reuse factor.

The reuse multiplier 1250 may include an MPUA including a plurality of MPUs. In this example, each of the plurality of MPUs may multiply each of the plurality of transformed IFM microbatches by the plurality of kernel microbatches.

Further, the reuse multiplier 1250 may include a plurality of MAA sets. In this example, each of the plurality of MAA sets may multiply each of the plurality of transformed IFM microbatches by the plurality of kernel microbatches.

The inverse transformer 1260 generates a plurality of inversely transformed outputs by inversely transforming a plurality of outputs of the reuse multiplier 1250 using an inverse transformation of the transformation used by the transformer.

The OFM generator 1270 generates OFM microbatches through quantization, non-linear function, and pooling on the plurality of inversely transformed outputs and writes the generated OFM microbatches to the pixel memory 1210.

The units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of hybrid traversal for a convolution neural network (CNN). In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. A processor-implemented method of providing a hybrid traversal for a convolutional neural network (CNN) accelerator architecture configured to perform direct convolution (DConv) and Winograd convolution (WgConv), the method comprising:
by one or more processors, performing a convolution operation selected between the DConv and the WgConv, the performing of the selected convolution operation including:
receiving input feature map (IFM) microbatches from a pixel memory and receiving kernel microbatches from a kernel memory;
generating output feature map (OFM) microbatches by multiplying the IFM microbatches by the kernel microbatches while reusing the kernel microbatches based on a kernel reuse factor; and
writing the OFM microbatches to the pixel memory, after quantization, non-linear function, and pooling on a result of the multiplying, wherein
each IFM microbatch comprises channels in a z-axial direction of an IFM,
each OFM microbatch comprises channels in the z-axial direction of an OFM,
each kernel microbatch comprises channels in the z-axial direction of a kernel, and
each microbatch of the IFM microbatches, the OFM microbatches, and the kernel microbatches is respectively packed in a single memory word.

2. The method of claim 1, wherein the method is implemented on the CNN accelerator architecture with a x-y first storage.

3. The method of claim 1, wherein the receiving of the IFM microbatches comprises receiving the IFM microbatches using any one or any combination of a strided convolution, a dilated convolution, and a deconvolution.

4. A hybrid traversal apparatus configured to perform direct convolution (DConv) and Winograd convolution (WgConv), the hybrid traversal apparatus comprising:
one or more circuitries configured to perform a convolution operation selected between the DConv and the WgConv, the performing of the selected convolution operation comprising;
receiving input feature map (IFM) microbatches from a pixel memory and to receiving kernel microbatches from a kernel memory;
multiplying the IFM microbatches by the kernel microbatches while reusing the kernel microbatches based on a kernel reuse factor; and
writing output of feature map (OFM) microbatches to the pixel memory, resulting from a performance of quantization, non-linear function, and pooling on results of the multiplication, wherein
each IFM microbatch comprises channels in a z-axial direction of an IFM,
each OFM microbatch comprises channels in the z-axial direction of an OFM,
each kernel microbatch comprises channels in the z-axial direction of a kernel, and
each microbatch of the IFM microbatches, the OFM microbatches, and the kernel microbatches is respectively packed in a single memory word.

5. The hybrid traversal apparatus of claim 4, wherein the hybrid traversal apparatus is implemented on a convolution neural network (CNN) accelerator architecture with a x-y first storage.

6. The hybrid traversal apparatus of claim 4, wherein the receiving of the IFM microbatches is implemented according to any one or any combination of a strided convolution, a dilated convolution, and a deconvolution.

7. A hybrid traversal apparatus configured to perform direct convolution (DConv) and Winograd convolution (WgConv), the hybrid traversal apparatus comprising:
one or more circuitries configured to perform a convolution operation selected between the DConv and the WgConv, the performing of the selected convolution operation comprising;
receiving input feature map (IFM) microbatches from a pixel memory and receiving kernel microbatches from a kernel memory;
multiplying the IFM microbatches by the kernel microbatches while reusing the kernel microbatches based on a kernel reuse factor to generate outputs;
generating output feature map (OFM) microbatches, resulting from quantization, non-linear function, and pooling on the outputs; and writing the OFM microbatches to the pixel memory, wherein each IFM microbatch comprises channels in a z-axial direction of an IFM, each OFM microbatch comprises channels in the z-axial direction of an OFM, each kernel microbatch comprises channels in the z-axial direction of a kernel, and each microbatch of the IFM microbatches, the OFM microbatches, and the kernel microbatches is respectively packed in a single memory word, wherein, during the convolution operation of the WgConv, the one or more circuitries further configured to, before the multiplying of the IFM microbatches, perform a transformation of the IFM microbatches, and generate inversely transformed outputs by inversely transforming the outputs using an inverse transformation of the transformation.

8. The hybrid traversal apparatus of claim 7, wherein the multiplying of the transformed IFM microbatches uses a multiply-accumulate pipeline circuit array (MPUA) comprising a plurality of multiply-accumulate circuitries (MPUs), wherein each of the MPUs is configured to multiply each of the transformed-IFM microbatches by the kernel microbatches.

9. The hybrid traversal apparatus of claim 7, wherein the multiplying of the IFM microbatches by the kernel microbatches comprises using multiply accumulate array (MAA) sets, wherein each of the MAA sets is configured to multiply each of the IFM microbatches by the kernel microbatches.

10. The method of claim 1, wherein the kernel is divided into the kernel microbatches where each kernel microbatch contains a subset of the kernel.

11. The method of claim 1, wherein a number of times the kernel memory is accessed is based on the kernel reuse factor.

12. The hybrid traversal apparatus of claim 4, wherein the kernel is divided into the kernel microbatches where each kernel microbatch contains a subset of the kernel.

13. The hybrid traversal apparatus of claim 4, wherein a number of times the kernel memory is accessed is based on the kernel reuse factor.

14. The hybrid traversal apparatus of claim 7, wherein the kernel is divided into the kernel microbatches where each kernel microbatch contains a subset of the kernel.

15. The hybrid traversal apparatus of claim 7, wherein a number of times the kernel memory is accessed is based on the kernel reuse factor.

16. The method of claim 1, wherein the reusing of the kernel microbatches includes multiplying a first kernel microbatch respectively with a first IFM microbatch and a second IFM microbatch.

17. The apparatus of claim 7, wherein the multiplying of the transformed IFM microbatches by the kernel microbatches comprises a multiply-accumulate pipeline circuit array (MPUA) comprising a plurality of multiply-accumulate pipeline circuitries (MPUs), and wherein a number of the pixel memories and a number of the MPUs are equal.

18. The method of claim 1, wherein a number of the pixel memory is equal to a number of the IFM microbatches.

19. The method of claim 1, wherein when the WgConv is selected, the method further comprising:

before multiplication of the IFM microbatches by the kernel mirobatches, performing a forward transformation of the IFM microbatches; and after the multiplication of the IFM microbatches by the kernel mirobatches, generating inversely transformed outputs by inversely transforming the outputs using an inverse transformation of the forward transformation.

20. The method of claim 1 is performed for both the DConv and WgConv using a single CNN accelerator architecture.

\* \* \* \* \*